United States Patent
Wang et al.

(10) Patent No.: US 8,100,574 B2
(45) Date of Patent: Jan. 24, 2012

(54) LIGHT MODULE

(75) Inventors: Wei-Chih Wang, Hsin-Chu (TW); Udo Custodis, Hsin-Chu (TW)

(73) Assignee: Young Lighting Technology Corporation, Hsin-Chu (TW)

(*) Notice: Subject to any disclaimer, the term of this patent is extended or adjusted under 35 U.S.C. 154(b) by 21 days.

(21) Appl. No.: 12/783,570

(22) Filed: May 20, 2010

(65) Prior Publication Data
US 2011/0286239 A1 Nov. 24, 2011

(51) Int. Cl.
*F21V 33/00* (2006.01)
(52) U.S. Cl. .......... 362/613; 362/612
(58) Field of Classification Search .......... 362/612, 362/613
See application file for complete search history.

(56) References Cited

U.S. PATENT DOCUMENTS

| | | | |
|---|---|---|---|
| 4,903,172 A * | 2/1990 | Schoniger et al. | 362/612 |
| 7,632,002 B1 * | 12/2009 | Park et al. | 362/616 |
| 7,946,746 B2 * | 5/2011 | Hsieh et al. | 362/612 |
| 2006/0002146 A1 * | 1/2006 | Baba | 362/613 |
| 2007/0076433 A1 | 4/2007 | Kinoshita et al. | |
| 2007/0247871 A1 * | 10/2007 | Yoo | 362/612 |
| 2008/0285307 A1 | 11/2008 | Aylward et al. | |
| 2008/0285310 A1 | 11/2008 | Aylward et al. | |
| 2008/0291668 A1 | 11/2008 | Aylward et al. | |
| 2009/0109672 A1 | 4/2009 | Lai | |
| 2009/0122227 A1 | 5/2009 | Hong et al. | |

FOREIGN PATENT DOCUMENTS

| | | |
|---|---|---|
| TW | 200730954 | 8/2007 |
| TW | 200933247 | 8/2009 |

OTHER PUBLICATIONS

"Extended Search Report of Europe Counterpart Application", issued on Aug. 17, 2011, p. 1-p. 9.

* cited by examiner

*Primary Examiner* — Laura Tso
(74) *Attorney, Agent, or Firm* — Jianq Chyun IP Office

(57) ABSTRACT

A light module includes a light guide plate, a light bar, and a first reflector. The light guide plate has a first edge surface, a second edge surface, and a top surface serving as a light-outgoing surface. The light bar is disposed on the first edge surface for providing an edge light source into the light guide plate. The light bar has a plurality of light-emitting devices. The first reflector is disposed on the second edge surface to reflect light back to a region above the light bar.

17 Claims, 7 Drawing Sheets

LIGHT MODULE

BACKGROUND OF THE INVENTION

1. Field of Invention

The invention relates to a light module. More particularly, the invention relates to a light module with an edge light source.

2. Description of Related Art

Planar light module to produce a large illuminating area has various applications. In order to have the planar light module with the large illuminating area, for the conventional manner, it uses an edge light to enter a light guide plate. Due to the effect of the light guide plate, the edge light is transformed into the planar light source.

In publication of TW 200730954, a backlight module used for liquid crystal display (LCD) device is disclosed. In FIG. 1, a tubular lamp 100 is covered by a lamp reflector 102 to reflect backward light into forward light. A light guide plate 104 is fixed on an edge of the lamp reflector 102. An optical plate with a reflection region 106 and a dispersion region 108 is disposed at the back of the light guide plate 104. A portion of the light in the light guide plate 104 may exit and be incident onto the dispersion region 108, which disperses the light, so that the light intensity at the tubular lamp 100 may be adjusted in to better uniform.

Basically, the conventional backlight module is for small area. If several modules are joined together, the joined gaps may still exist, disturbing the visual effect. Other designs of the light module with edge light source are still under developed.

SUMMARY

The invention provides a light module with an edge light source, and the edge above the edge light source may be kept rather invisible.

The invention provides a light module including a light guide plate, a light bar and a reflector. The light guide plate has a first edge surface, a second edge surface, and a top surface. The first edge surface is opposite to the second edge surface, and the top surface serves as a light-outgoing surface. The light bar is disposed on the first edge surface for providing an edge light source into the light guide plate. The light bar has a plurality of light-emitting devices. The reflector is disposed on the second edge surface to reflect light back to a region above the light bar.

The invention also provides a light module including a plurality of light panels, and the light panels may be joined one after one. Each of the light panels includes a light guide plate, a light bar and a reflector. The light guide plate has a first edge surface, a second edge surface and a top surface. The first edge surface is opposite to the second edge surface, and the top surface serves as a light-outgoing surface. The light bar is disposed on the first edge surface for providing an edge light source into the light guide plate. The light bar has a plurality of light-emitting devices. The reflector is disposed on the second edge surface to reflect light back to a region above the light bar.

The invention also provides a light module including a light guide plate, a first light bar and a second light bar. The light guide plate has a first edge surface, a second edge surface, a top surface and a bottom surface. The first edge surface is opposite to the second edge surface, and the top surface serves as a light-outgoing surface. The first light bar is disposed on the first edge surface for providing an edge light source into the light guide plate. The first light bar has a plurality of first light-emitting devices. The second light bar is disposed on the second edge surface for providing another edge light source into the light guide plate. The second light bar has a plurality of second light-emitting devices.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

A light module is proposed in an embodiment of the invention. The light module is designed to be about invisible on the edge when the edge light source is implemented. In more applications, when multiple light modules are joined together as a larger size of illuminating area, the joined edge is rather invisible by the user. In other words, the phenomenon of brighter or darker line at the joined edge is effectively reduced.

Several embodiments are provided to describe the invention. However, the invention is not just limited to the embodiments. Further, the embodiments may be properly combined to each other.

Figure 1:
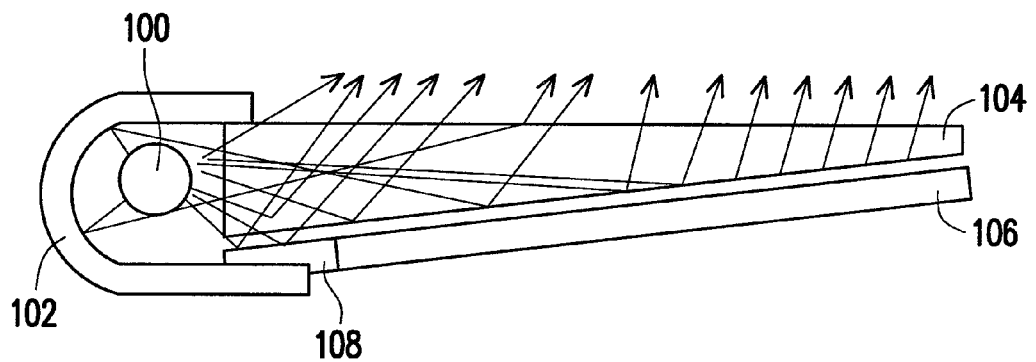
FIG. 1 is a cross-sectional view, schematically illustrating a conventional backlight module with edge light source.
Figure 2:
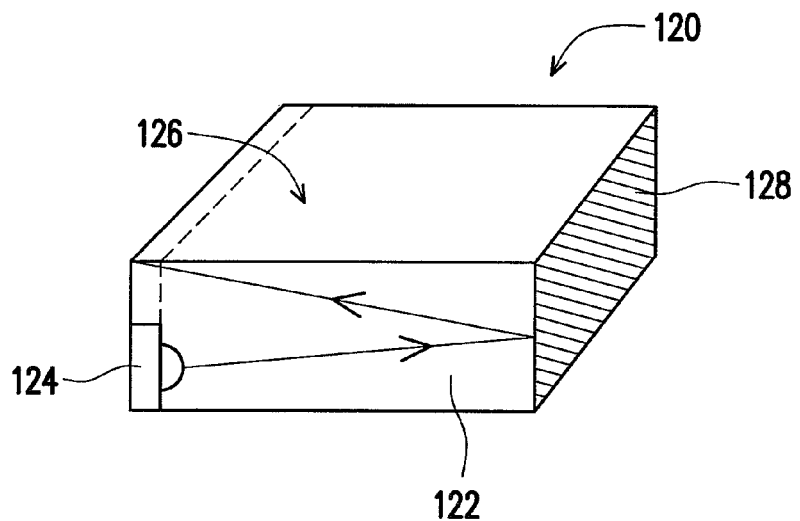
FIG. 2 is a perspective view, schematically illustrating a light module, according to an embodiment of the invention.

In FIG. 2, generally, a light module 120 includes a light guide plate 122, a light bar 124, and a reflector 128. The light guide plate 122 has a top surface 126 serving as a light-outgoing surface. The light bar 124 is disposed on a first edge surface of the light guide plate 122 for providing an edge light source into the light guide plate 122. The light bar 124 has a plurality of light-emitting devices, such as light emitting diodes (LEDs), being lower in height than the top surface 126. The reflector 128 is disposed on a second edge surface of the light guide plate 122 to reflect a portion of the edge light source back to a region above the light bar 124. In this embodiment, the second edge surface of the light guide plate 122 is opposite to the first edge surface of the light guide plate 122.

In this embodiment, the LED of the light bar 124 is located at the lower portion of the light guide plate 122 being lower in height than the top surface 126. In order to avoid causing a darker line above the light bar 124 when the user looks on the top surface 126, the reflector 128 is implemented at the second edge surface of the light guide plate 122 to make a portion of the light from the light bar 124 to be reflected back to the region above the light bar 124. As a result, the light intensity is adjusted to be about the same brightness. The user does not feel the existing of the light bar 124. A lower surface of the light guide plate 122 may be also implemented with a reflective layer, that is, the lower surface opposite to the top surface 126 of the light guide plate 122 may be also implemented with the reflective layer. The top surface 126 serves as the light outgoing surface for illumination.

In alternative option, the light bar 124 as shown in dashed line may also extend up to the top surface 126 to be integrated with the light guide plate 122 with similar material. However, the LED remains lower, so that some portion of light may reach above the LED to provide the light compensation.

Figure 3:
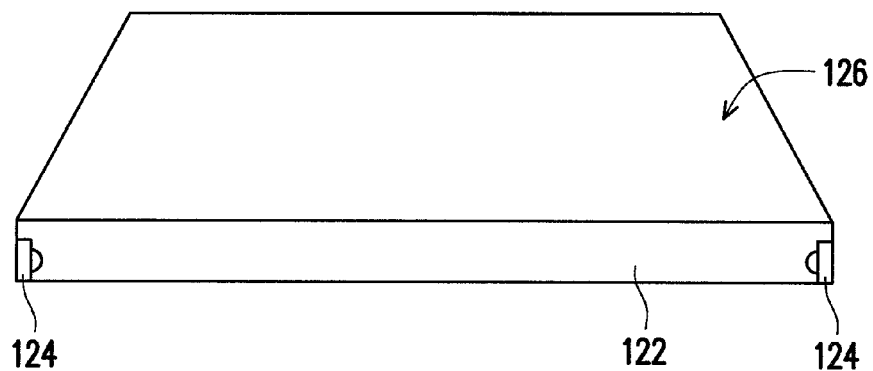
FIG. 3 is a perspective view, schematically illustrating a light module, according to an embodiment of the invention.

In FIG. 3, with the same concept, the reflector at the second edge surface of the light guide plate 122 in FIG. 2 may be omitted. However, another light bar 124 may be also implemented at the second edge surface in FIG. 3. The light from the opposite light bar 124 may also emit a potion light to reach the region above the light bar 124 under concerning. As a result, for a large size of illuminating area, the user may just see the about uniform brightness on the top surface 126 without actually sensing the existence of the light bar 124 at the edge.

Figure 4:
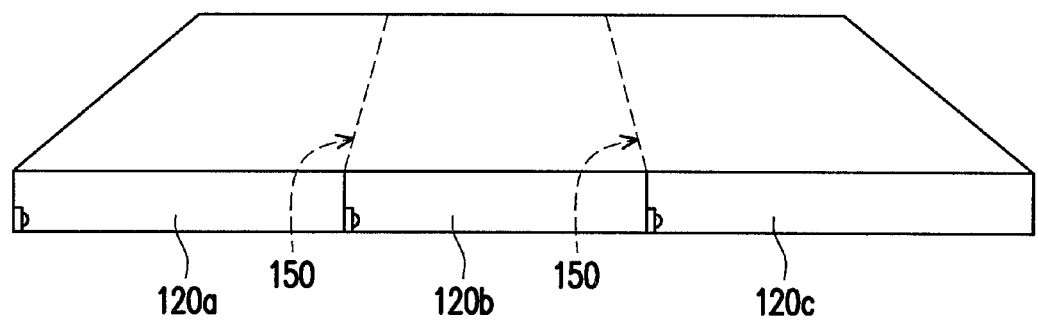
FIG. 4 is a perspective view, schematically illustrating a light module with multiple light units, according to an embodiment of the invention.

In FIG. 4, based on the features of about invisible edge as described above, several light module units, such as light module units 120a, 120b, and 120c, may be joined one after one. The joined interface 150 may remain invisible. As a result, a large area of illumination may be achieved.

Figure 5:
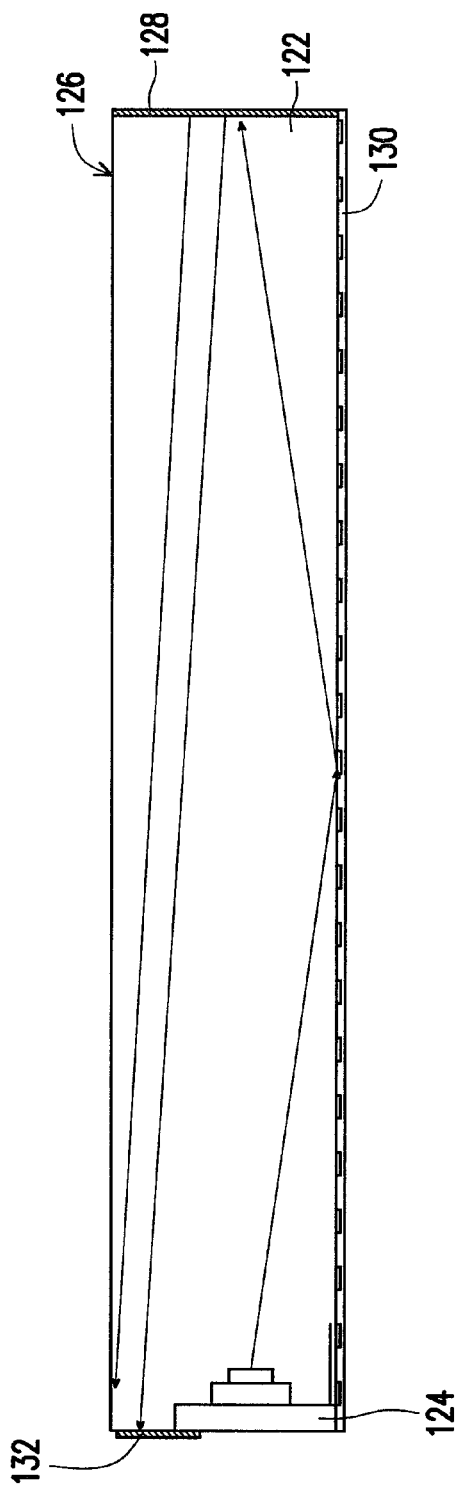
FIG. 5 is a cross-sectional view, schematically illustrating light module in accordance with the structure in FIG. 2, according to an embodiment of the invention.

In the following descriptions, the structures in more details are described. In FIG. 5, in addition to the basic structure in FIG. 2, the light guide plate 122 may even further have a reflection layer 130, which may effectively reflect the incident light for reducing light leakage. However, the reflection layer 130 is an option in use. The reflector 128 at the edge surface opposite to the light bar 124 may reflect a portion of the light back to the region above the LEDs of the light bar 124. Here in this example, the reflector 128 covers the whole edge surface opposite to the light bar 124. However, the reflector 128 may not fully cover the whole edge surface in other option. More examples are to be described later. Depending on the need to adjust the light intensity at the edge region, another reflector 132 may also be implemented on the edge surface above the LED of the light bar 124. Therefore, the dark line above the light bar 124 may be further compensated.

Figure 6:
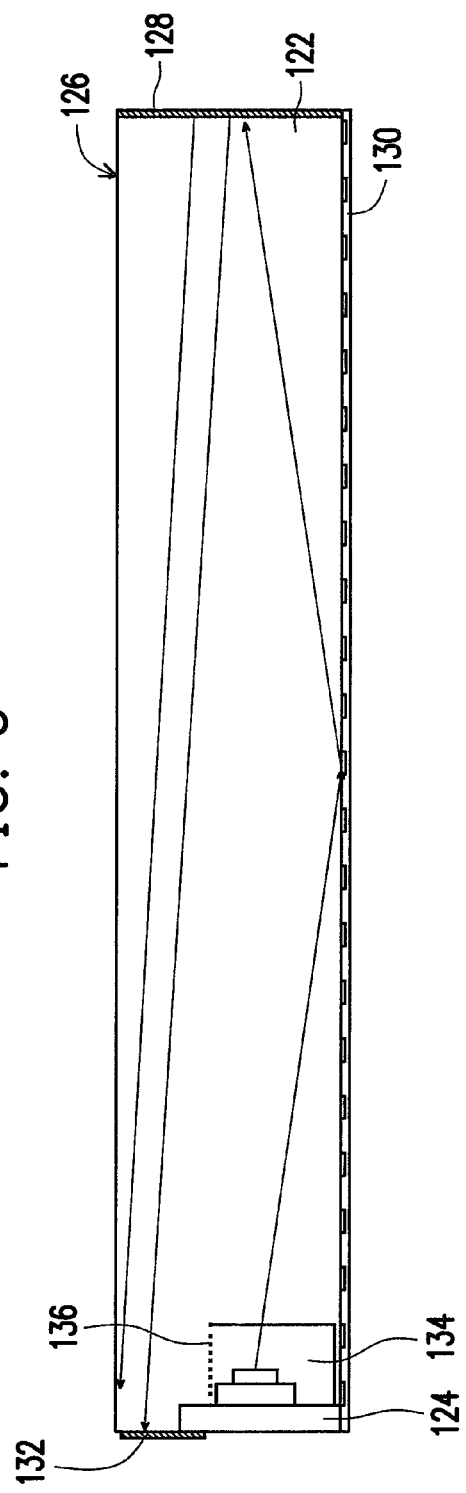
FIG. 6 is a cross-sectional view, schematically illustrating light module in accordance with the structure in FIG. 2, according to an embodiment of the invention.

In FIG. 6, additional element may be further added. For example, since each individual LED of the light bar 124 may cause a local brighter region, an elastic transparent material 134 may be used to cover the LED. The elastic transparent material 134, serving as an interface, allows the light from the LED to smoothly enter the light guide plate 122. However, a semitransparent diffuser layer 136 may be formed on top of the elastic transparent material 134. As a result, it may be avoided that the light from the LED directly emit to the top surface 126 to cause a local bright spot. As a result, the light intensity on the top surface 126 is uniform. The edge and the LED are effectively invisible.

Figure 7:
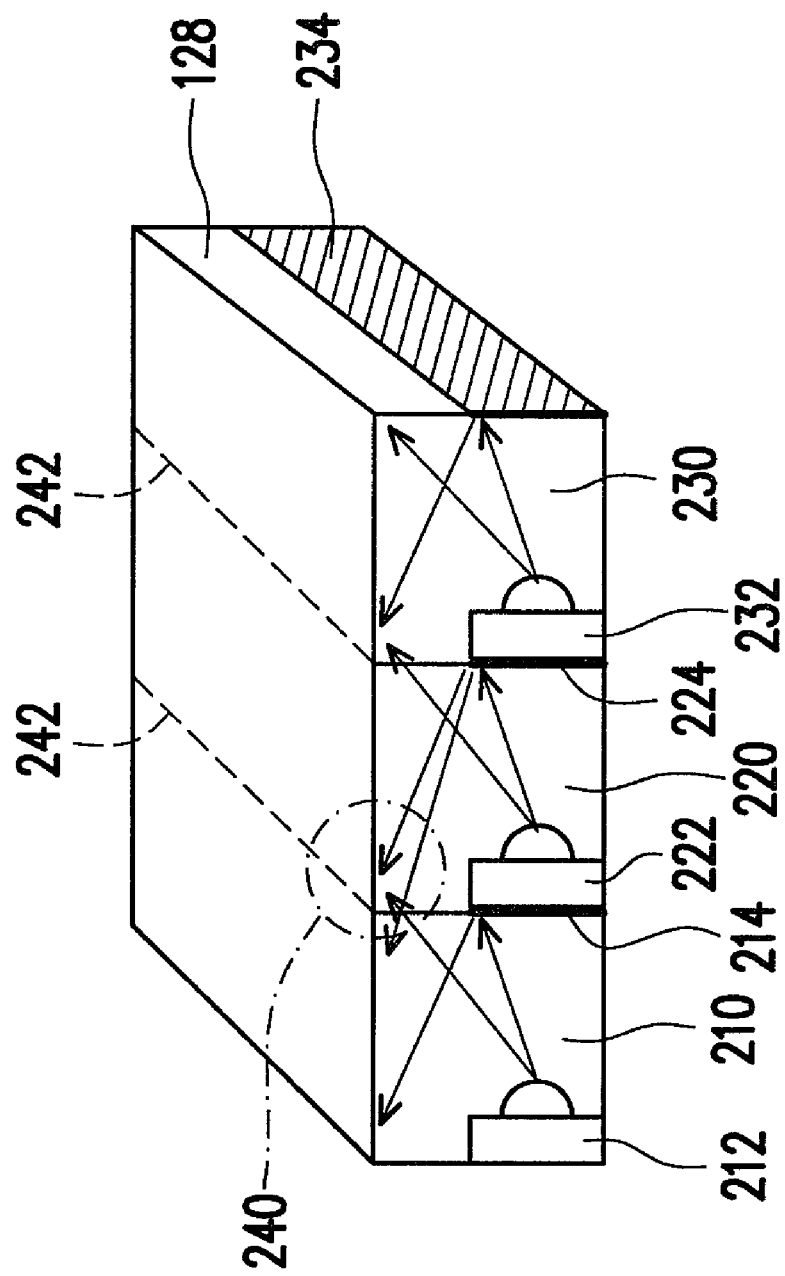
FIG. 7 is a perspective view, schematically illustrating light module, in accordance with the structure in FIG. 4, according to an embodiment of the invention.

In further applications, due to the property of invisible edge of the light module, several light modules may be assembled into a larger area of illumination. In FIG. 7, three light modules are taken as the example to assemble together as a larger area. Based on the same concept of design, the LED of the light bars 212, 222, 232 in each light module are lower in height than the light guide plate 210, 220, 230. In this example, the reflectors 214, 224, 234 may just cover the region behind the light bars 212, 222, 232, respectively. The reflectors 214, 224, 234 may also reflect a portion of the light to the region 240 above the light bar 212, 222, 232. Since the reflectors 214, 224, 234 do not fully cover the edge surfaces, another portion of the light may also directly reach to the region 240. As a result, the edge interface 242 between the light modules may be effectively smoothed and may become effectively invisible.

In FIG. 8(a), the light guide plate 250 may have a trench 252 at the bottom. The light bar 254 with elastic transparent material, such as the elastic transparent material 134 in FIG. 6, may be disposed in the trench 252. The operation mechanism in the embodiment is substantially the same with the above operation mechanism. In this manner, the light bar 254 is embedded in the light guide plate 250. This is also useful to assemble several light modules together into a large area. This also indicates that the light bar may be implemented with the light guide plate 250 in other option.

However, the embodiment keeps the LEDs of the light bar 254 be lower in height, so that a portion of the light may be guided to the region above the light bar 254, so as to adjust the light intensity at the edge and let the edge to be effectively invisible.

Figure 8:
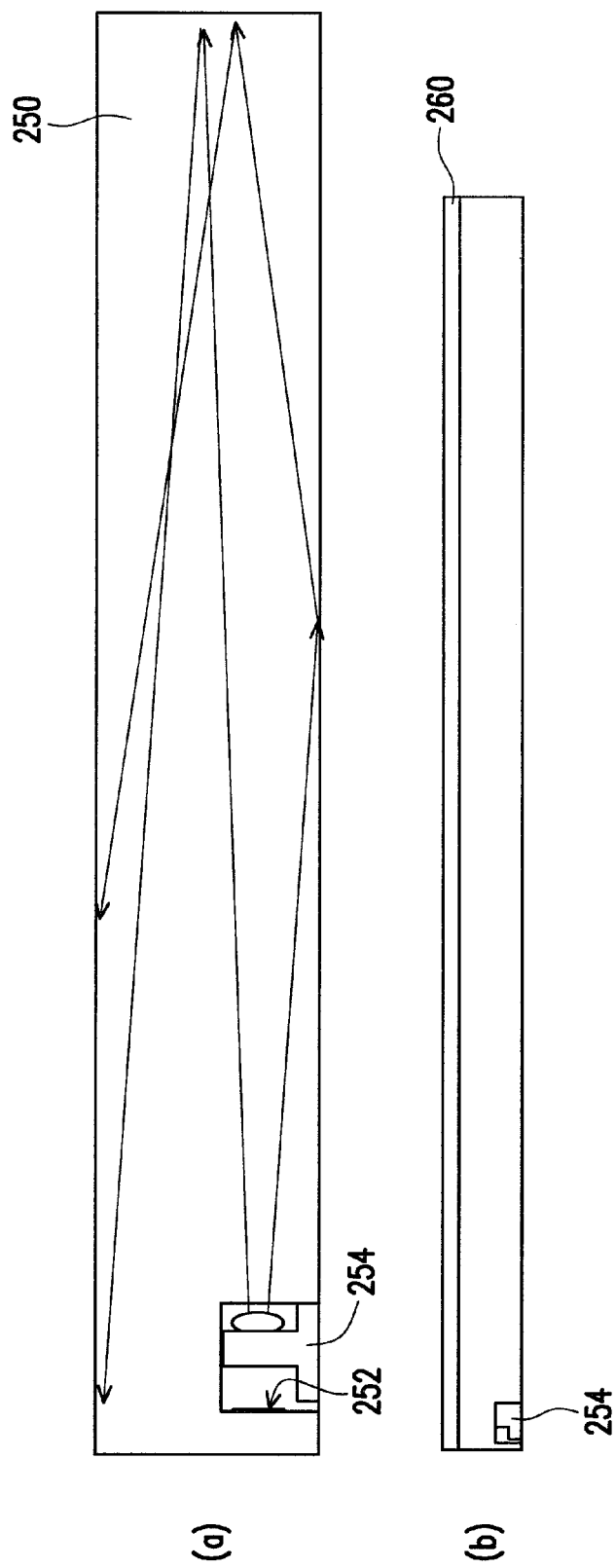
FIG. 8 is a cross-sectional view, schematically illustrating light module, according to an embodiment of the invention.

Further in FIG. 8(*b*), an additional diffuser layer 260 may be further disposed on top surface of the light guide plate 250. The output light becomes more uniform, so the edge corresponding to the light bar 254 is not effectively seen.

Figure 9:
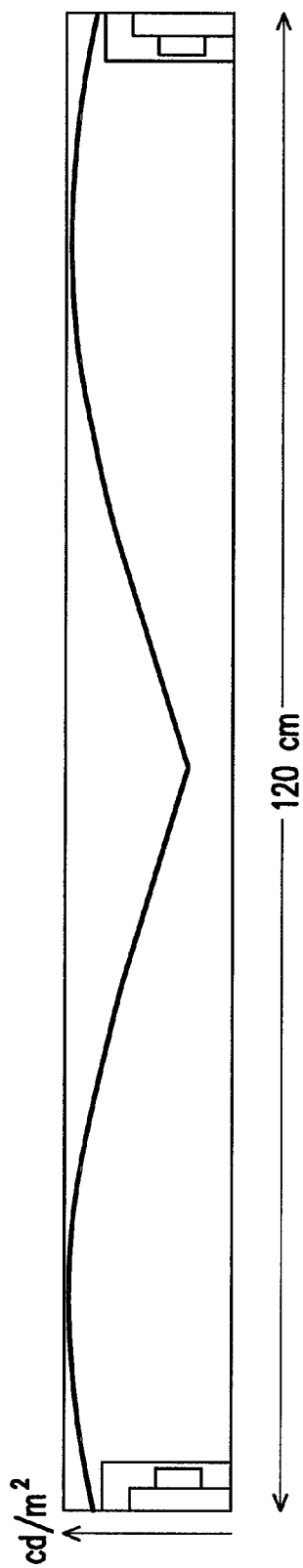
FIG. 9 is a cross-sectional view, schematically illustrating light module with simulated light intensity distribution, according to an embodiment of the invention.

Even further, if the light module itself has been in large area, the additional light bar (unshown) may be used in FIG. 3. In the following descriptions, the properties of light intensity are investigated. In FIG. 9, the traditional variation of the light intensity in calculation by cd/m$^2$ is shown by the thick line. The two light bars are used at both edge surfaces, and the light bars are disposed face to face. Traditionally, when the light panel of the single light module is long, such as 120 cm, the light intensity at the middle region would be degraded; that is, the middle region is lower then the side region.

Figure 10:
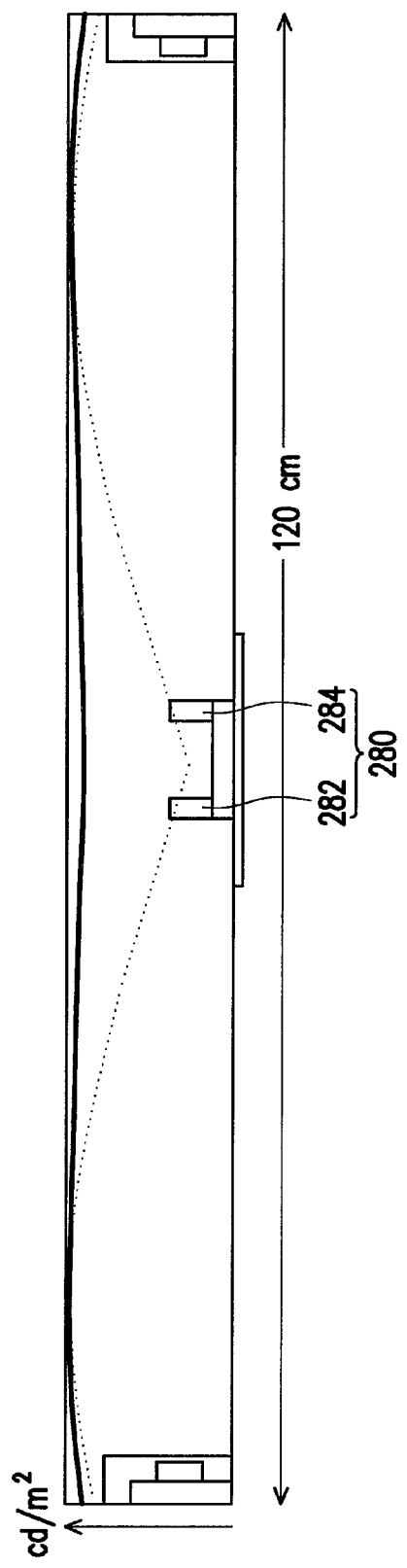
FIG. 10 is a cross-sectional view, schematically illustrating light module with light intensity distribution, according to an embodiment of the invention.

In order to compensate the traditional light intensity at the middle region, in the FIG. 10, additional LEDs may be added at the middle region based on the same principle described above. To be more specific, a set of light source devices, such as LED set 280, may be implemented at the middle region of the light guide plate. The middle LED set 280 includes a set of LED 282 and another set of LED 284. The set of LED 282, for example, is lower in height and faces to the light bar at one edge surface. Likewise, the set of LED 284, for example, is lower in height and faces to the light bar at the other edge surface. In FIG. 10, the curve with the dotted line is shown to indicate the traditional light intensity in FIG. 9, and the thick solid line shows the light intensity when the middle LED set 280 is implemented of the embodiment. As may be seen, the light intensity of the embodiment is more uniform than the traditional light intensity, and the middle region of the embodiment has been compensated.

Figure 11:
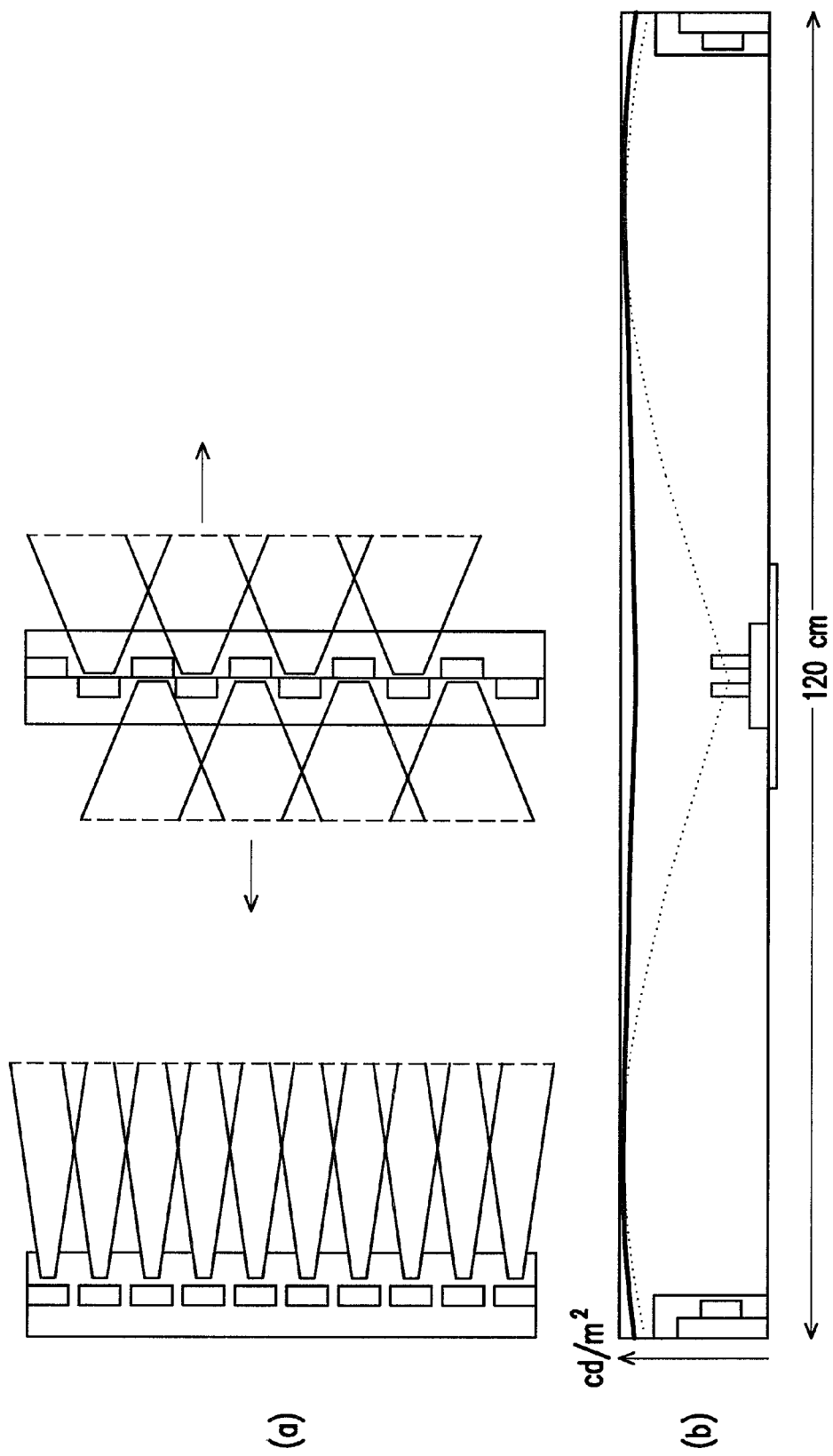
FIG. 11 is a cross-sectional view, schematically illustrating light module with simulated light intensity distribution, according to an embodiment of the invention.

In FIG. 11, an alternative design for the middle LEDs is shown. FIG. 11(*a*) is a top view and FIG. 11(*b*) is a side view. In FIG. 11(*a*), each LED emits light in a cone-like shape. After a certain distance, the lights from the LEDs of the light bar are merged. The opposite light bar has the same properties but not shown. However, the middle LEDs may be arranged into two sets. One set of the LEDs faces to one of the light bars, such as the left light bar, and another set of LEDs faces to another one of the light bars, such as the right light bar. The two set of LEDs may be alternatively disposed. The number of the middle LEDs is adjustable. As a result in FIG. 11(*b*), again, the light intensity shown in solid line of the embodiment is more flat than the traditional light intensity shown in the dotted line.

In fabrication to implement the middle LEDs, for example, the middle LEDs may be also formed as a light bar. In addition, the light guide plate may be formed with a trench. Likewise, the middle LEDs in light bar form may be disposed into the trench of the light guide plate with the elastic transparent material. The elastic transparent material may protect the LED and also server as the material interface between the LED and the light guide plate. Due to the elastic property, the contact surface may be tightly fit and the light may successfully enter the light guide plate. However, this manner is just an example, and is not the only choice in design.

The foregoing description of the preferred embodiments of the invention has beened for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light module, comprising:
   a light guide plate, having a first edge surface, a second edge surface being opposite to the first edge surface, and a top surface serving as a light-outgoing surface;
   a light bar, disposed on the first edge surface for providing an edge light source into the light guide plate, wherein the light bar has a plurality of light-emitting devices, and the light bar is embedded at a bottom trench of the light guide plate; and
   a first reflector, disposed on the second edge surface to reflect light back to a region above the light bar.

2. The light module of claim 1, further comprising:
   a second reflector, disposed on the first edge surface for reflecting light back to the light guide plate.

3. The light module of claim 1, wherein the light bar is lower or equal in height to the top surface.

4. The light module of claim 3, further comprising:
   a second reflector, disposed on a back edge surface of the light bar above the light-emitting devices.

5. The light module of claim 1, wherein the light guide plate has a bottom surface with a reflection layer.

6. The light module of claim 1, wherein the light bar comprises:
   a elastic transparent material, encapsulating on a light emitting surface of the light-emitting devices; and
   a semitransparent diffuser layer, disposed on the elastic transparent material above the light emitting surface.

7. The light module of claim 1, further comprising:
   a diffuse layer, disposed on the top surface of the light guide plate.

8. A light module, comprising:
   a plurality of light panels, joined one after one, wherein each of the light panels comprises:

a light guide plate, having a first edge surface, a second edge surface being opposite to the first edge surface, and a top surface serving as a light-outgoing surface;

a light bar, disposed on the first edge surface for providing an edge light source into the light guide plate, wherein the light bar has a plurality of light-emitting devices; and a first reflector, disposed on the second edge surface to reflect light back to a region above the light bar.

9. The light module of claim 8, wherein the first reflector is at a lower region of the light bar.

10. The light module of claim 8, wherein the light bar is embedded at a bottom of the light guide plate.

11. The light module of claim 8, wherein the light bar is embedded at a bottom trench of the light guide plate.

12. The light module of claim 8, further comprising:

a second reflector, disposed on the first edge surface for reflecting light back to the light guide plate.

13. The light module of claim 8, wherein the light bar is lower or equal in height to the top surface.

14. A light module, comprising:

a light guide plate, having a first edge surface, a second edge surface being opposite to the first edge surface, a top surface serving as a light-outgoing surface, and a bottom surface;

a first light bar, disposed on the first edge surface for providing an edge light source into the light guide plate, wherein the first light bar has a plurality of first light-emitting devices;

a second light bar, disposed on the second edge surface for providing another edge light source into the light guide plate, wherein the second light bar has a plurality of second light-emitting devices;

a first set of light-emitting devices, disposed on the bottom surface, emitting light toward the first edge surface; and a second set of light-emitting devices, disposed on the bottom surface, emitting light toward the second edge surface, wherein the first set of the light-emitting devices and the second set of the light-emitting devices are disposed at a middle line region of the light guide plate, and are lower in height than the light guide plate.

15. The light module of claim 14, wherein the first set of the light-emitting devices and the second set of the light-emitting devices are alternatively disposed.

16. The light module of claim 14, wherein the first light bar and the second light bar are embedded at a bottom of the light guide plate.

17. The light module of claim 14, wherein the first light bar and second light bar are lower or equal in height to the light guide plate but the edge light source is lower in height than the light guide plate.

* * * * *